(12) United States Patent
Ashiura et al.

(10) Patent No.: US 7,282,542 B2
(45) Date of Patent: Oct. 16, 2007

(54) MODIFICATION METHOD OF POLYMER

(75) Inventors: Makoto Ashiura, Hiratsuka (JP); Tetsuji Kawazura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 11/329,082

(22) Filed: Jan. 11, 2006

(65) Prior Publication Data

US 2006/0155079 A1  Jul. 13, 2006

(30) Foreign Application Priority Data

Jan. 12, 2005  (JP)  ............................. 2005-005028

(51) Int. Cl.
*C08C 19/22* (2006.01)
*C08C 19/25* (2006.01)
*C08F 8/30* (2006.01)

(52) U.S. Cl. .................... 525/377; 525/374; 525/333.8

(58) Field of Classification Search ................ 525/377, 525/333.8, 374
See application file for complete search history.

(56) References Cited

U.S. PATENT DOCUMENTS 4,581,429 A * 4/1986 Solomon et al. ............ 526/220
6,084,015 A * 7/2000 Chino et al. ................ 524/189
6,177,519 B1   1/2001 Chung et al.
2003/0139536 A1* 7/2003 Bertin et al. ................ 525/377

FOREIGN PATENT DOCUMENTS

| JP | 08-239510 A1 | 9/1996 |
| JP | 10-182881 A1 | 7/1998 |
| JP | 2003-524037 A1 | 8/2003 |
| JP | 2004-311135 | 11/2004 |
| JP | 2006-152229 | 6/2006 |

* cited by examiner

*Primary Examiner*—Ling-Sui Choi
(74) *Attorney, Agent, or Firm*—Connolly, Bove, Lodge & Hutz, LLP

(57) ABSTRACT

A method for modifying a polymer comprising modifying a polymer capable of decomposing with a carbon radical in the molecule thereof by a reaction with a radical initiator and a compound having a nitroxide radical in the molecule thereof to thereby decrease a molecular weight of the polymer and also to thereby introduce an organic group derived from the free radical into the polymer.

5 Claims, No Drawings

MODIFICATION METHOD OF POLYMER

BACKGROUND OF THE INVENTION

1. Field of the Invention

The present invention relates to a method for modifying a polymer, more specifically relates to a method for reacting a compound having a nitroxide radical in the molecule thereof and a radical initiator to a polymer capable of decomposing with a carbon radical in the molecule thereof to thereby decrease the molecular weight of the polymer and to also introduce a functional group into the polymer.

2. Description of the Related Art

For example, as described in Japanese Patent Publication (A) No. 10-182881, it has been proposed to compound stable free radicals such as TEMPO (i.e., 2,2,6,6-tetramethyl-1-piperidinyloxy radicals) into rubber to improve the physical properties of the rubber composition, in particular the physical properties such as processability and abrasion resistance. Further, Japanese Patent Publication (A) No. 8-239510 discloses to introduce a TEMPO derivative into a polymer to prevent aging of the polymer. However, there is no technology relating to the modification of the polymers by the intentional formation of a carbon radical in polymers such as rubber using a compound having stable free radicals in its molecule. The technique of using a nitroxide radical for modifying a polymer is described in U.S. Pat. No. 4,581,429, but this introduces the nitroxide radicals as a counter radical for living radical polymerization and is not used for the purpose of imparting functional groups. Japanese Patent Publication (A) No. 2003-524037 discloses a reaction in the presence of a free radical using a polyfunctional nitroxide radical as a reversible cross-linking agent, but this is not used for the purpose of imparting a functional group. U.S. Pat. No. 6,177,519 describes technology for decreasing the molecular weight of an isobutylene-p-methylstyrene copolymer, while grafting a vinyl silane compound to use as a sealant or binder. However, there would be a high possibility of problems such that homopolymer of the vinyl silane compound is formed in the system. Note that the present inventors previously proposed the technique of using a nitroxide radical compound and a radical initiator to suppress the reduction in the molecular weight of a polymer, while introducing a functional group into the polymer (see Japanese Patent Application No. 2004-311135).

Since butyl rubber, EPM, etc. are low in polarity, the compatibility thereof with resins such as polyamides, polyesters and are inferior in bonding with glass etc. Therefore, to increase the polarity of these polymers and facilitate reaction at the interfaces, attempts have been made to use radical initiators to graft functional monomers. However, the constituent units of these polymers include units to be decomposed by hydrogen abstraction of the radicals, and therefore there is a very high possibility of a decrease in the molecular weight during the modification and also the radical initiator and a functional monomer are directly reacted to result in a decrease in the graft efficiency, the homopolymers, in some cases, are formed in the system. However, the decrease in the molecular weight increases the fluidity and tackiness of a polymer, so that property can be utilized as a binder, sealant, etc.

Accordingly, an object of the present invention is to develop a technique for introducing a functional group into a radical degradation type polymer, while intentionally decreasing the molecular weight.

In accordance with the present invention, there is provided a method for modifying a polymer comprising:

modifying a polymer capable of decomposing with a carbon radical in the molecules thereof by a reaction with a radical initiator and a compound having a nitroxide radical in the molecule thereof to decrease the molecular weight of the polymer and also to introduce an organic group derived from the free radical into the polymer and a modified polymer obtained from the same and a rubber composition containing the same.

According to the present invention, by reacting a radical initiator and a compound having a nitroxide radical in the molecule thereof to a polymer capable of decomposing with a carbon radical in the molecules thereof, it is possible to decrease the molecular weight of the polymer and also to introduce an organic group derived from the free radical into the polymer. It is preferable reaction with a ratio of the nitroxide radical/the radical initiator (molar ratio) of less than 0.7 is preferable.

BEST MODE FOR CARRYING OUT THE INVENTION

In this specification and in the claims which follow, the singular forms "a", "an" and "the" include plural referents unless the context clearly dictates otherwise.

The inventors engaged in research for introducing a function group to a radical degradation type polymer, while intentionally decreasing the molecular weight and, as a result, found that the above object can be achieved by the modification of adding both a compound containing a stable free radical superior in the ability to trap carbon radicals, that is, a nitroxide radical, and a radical initiator.

Polymers such as butyl rubber, EPM are low in polarity, and therefore, have the defects that they are low in compatibility with resins such as polyamide, polyester, and further are inferior in bonding with glass etc. Therefore, as the method for increasing the polarity of these low polarity polymers and obtaining reaction at the interfaces, the method for introducing a functional group may be mentioned. To introduce a functional group, usually the technique is utilized of causing the formation of a radical on the molecular chain and reacting the radical with a compound having a functional group, but, as shown in the conventional method of the chemical formula given below, the constituent unit of the polymer include a unit capable of being degradated by hydrogen abstraction of the radical, and a decrease in the molecular weight occurs during the modification. Further, there is a high possibility of the radical initiator and the functional monomer directly reacting resulting in a decrease in the graft efficiency or the homopolymers are formed in the system in some cases.

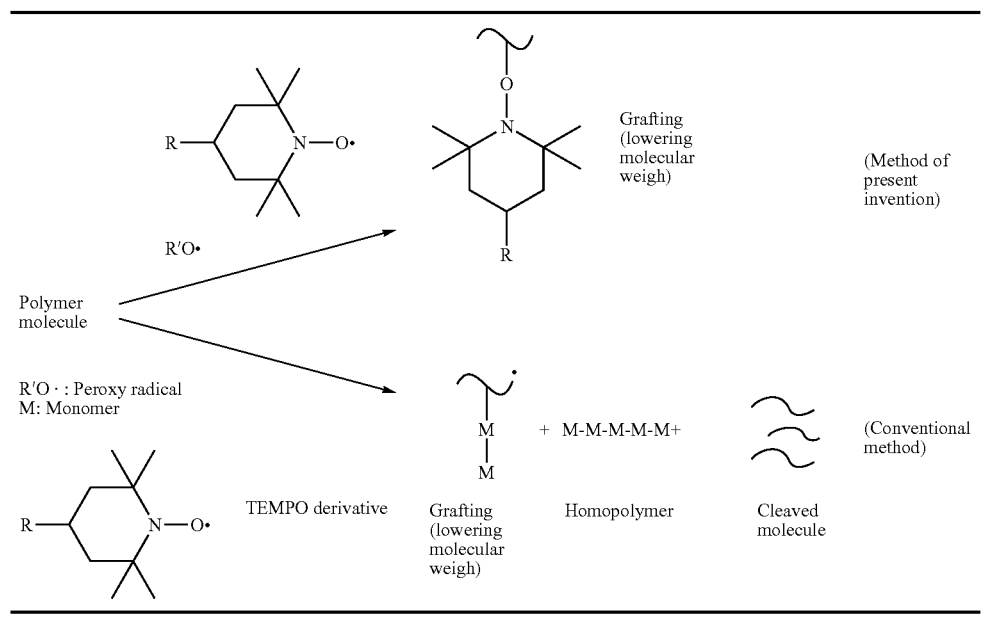

On the other hand, in the method of the present invention, as shown schematically by the above chemical formula, the present inventors engaged in intensive studies on the method of introducing a functional group to a radical degradation type polymer while decreasing the molecular weight and, as a result, were able to achieve the above object by the modification of adding the stable free radical superior in the capability to trap a carbon radical as constituted by a nitroxide radical compound and the radical initiator (C) and is able to obtain a modified polymer not containing any homopolymers.

Compounds having stable free radicals such as TEMPO quickly trap radicals generated from cleavage of rubber by light, heat or mechanical means. However, when trying to introduce a functional group into a polymer molecule, with just a compound having a stable free radical such as TEMPO the polymer cannot be sufficiently modified, and therefore, in the present invention, a carbon radical is intentionally generated on the polymer molecular chain so as to introduce the desired functional group into the polymer molecule.

As the polymer capable of being modified according to the present invention, for example, butyl rubber (IIR), brominated butyl rubber, isobutylene-p-methylstyrene copolymer, brominated isobutylene-p-methylstyrene copolymer, polyisobutylene, polybutene, ethylene-propylene-diene terpolymer (EPDM), ethylene-propylene copolymer (EPM), ethylene-butene copolymer, polystyrene-based TPE (SEBS, SEPS), polyolefin-based TPE, polypropylene, fluororubber, hydrogenated acrylonitrile-butadiene copolymer rubber (H-NBR), ethylene-propylene-butene copolymer, etc. may be mentioned.

As the compound including nitroxide radicals (—N—O.) in its molecules usable in the present invention, the following compounds may be illustrated. Note that the amounts of addition of these compounds are, based upon 100 parts by weight of the polymer, preferably 0.01 to 40 parts by weight, more preferably 0.05 to 30 parts by weight.

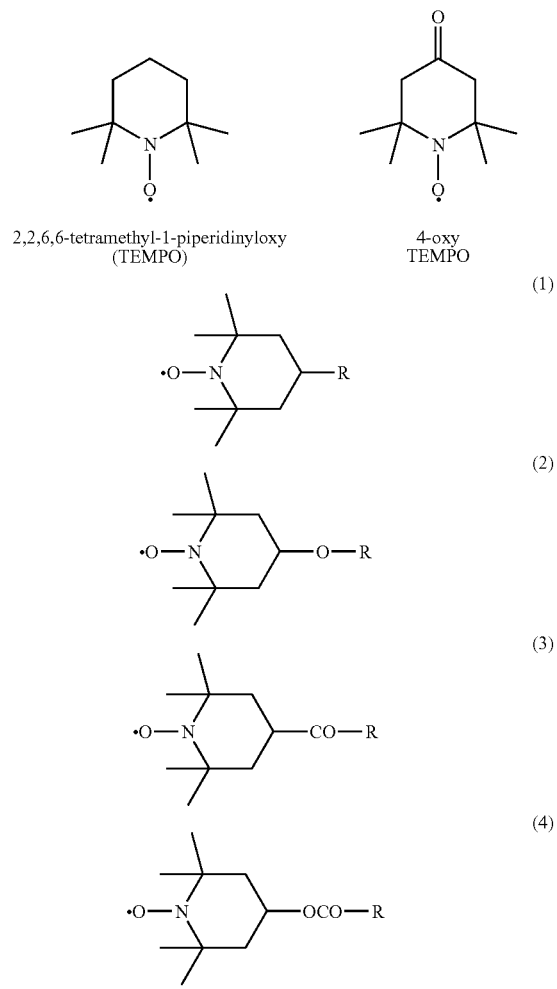

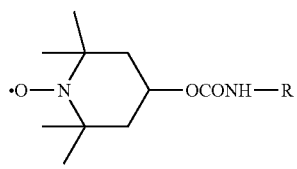

(5)

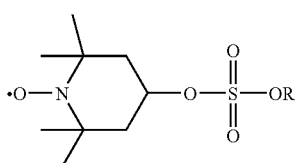

(6)

where, in formulas (1) to (6), R indicates an organic group including a $C_1$ to $C_{30}$ alkyl group, allyl group, amino group, isocyanate group, hydroxyl group, thiol group, vinyl group, epoxy group, thiurane group, carboxyl group, carbonyl-group-containing group (e.g., succinic anhydride, maleic anhydride, glutaric anhydride, phthalic anhydride, and other cyclic acid anhydrides), amide group, ester group, imide group, nitrile group, thiocyan group, $C_1$ to $C_{20}$ alkoxy group, silyl group, alkoxysilyl group, nitro group, and other functional groups.

(1)

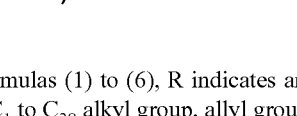

4-phenyl TEMPO    4-methyl TEMPO

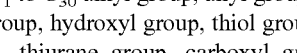

4-ethyl TEMPO    4-chloro TEMPO (2)

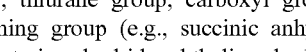

4-phenoxy TEMPO

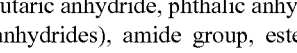

4-methoxy TEMPO    4-ethoxy TEMPO (3)

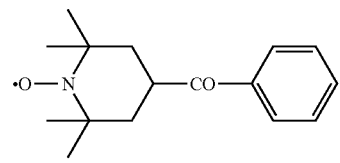

4-benzoyl TEMPO

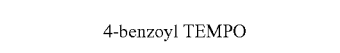

4-methylcarbonyl TEMPO    4-ethylcarbonyl TEMPO (4)

4-benzoyloxy TEMPO

4-acetoxy TEMPO

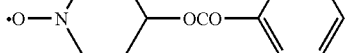

4-ethoxycarbonyl TEMPO (5)

4-(N-phenylcarbamoyloxy) TEMPO

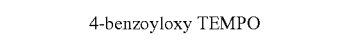

4-(N-methylcarbamoyloxy) TEMPO

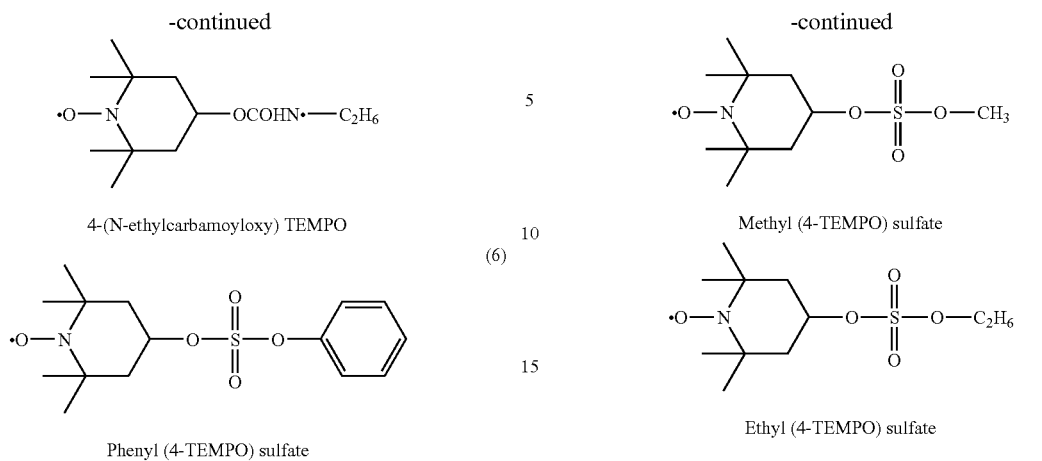
4-(N-ethylcarbamoyloxy) TEMPO
Phenyl (4-TEMPO) sulfate
Methyl (4-TEMPO) sulfate
Ethyl (4-TEMPO) sulfate
Other examples are given below.
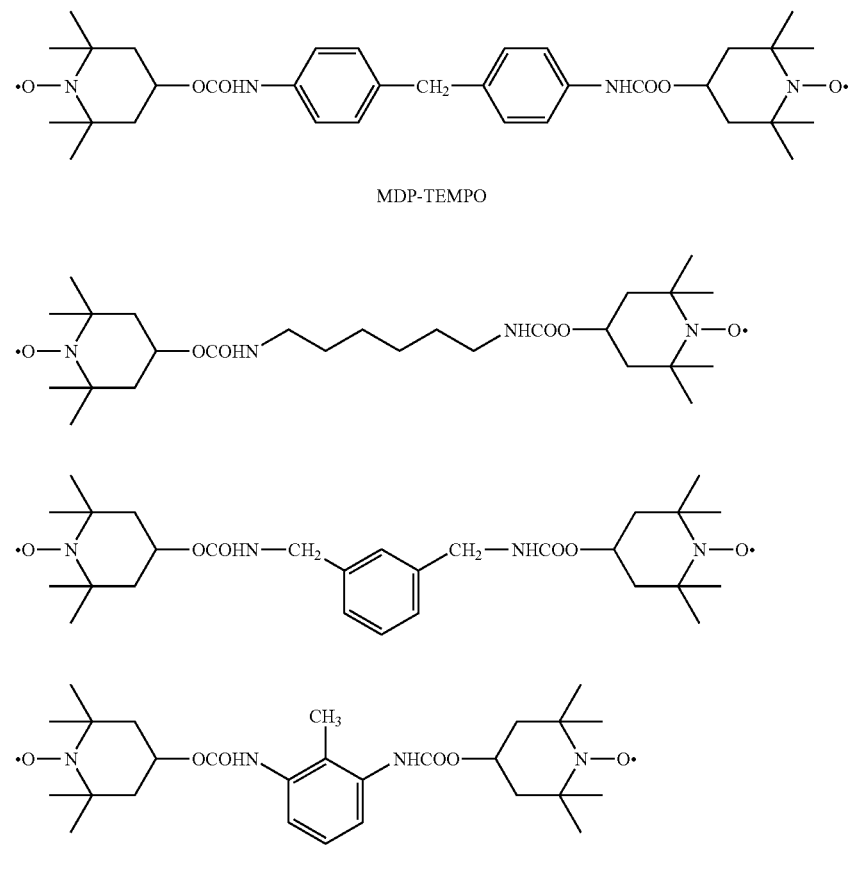
MDP-TEMPO

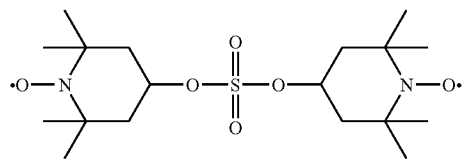
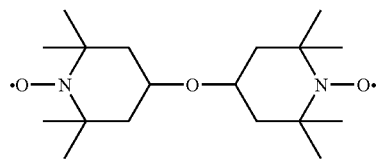
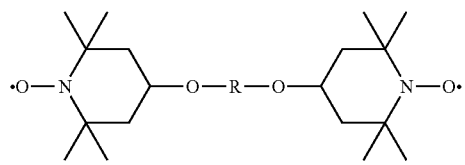
(wherein, R indicates a $C_1$ to $C_{30}$ alkyl group or phenyl group)
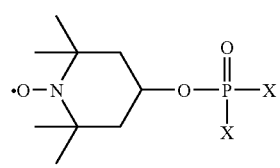
2,2,6,6-tetramethylpiperidin-1-yloxy
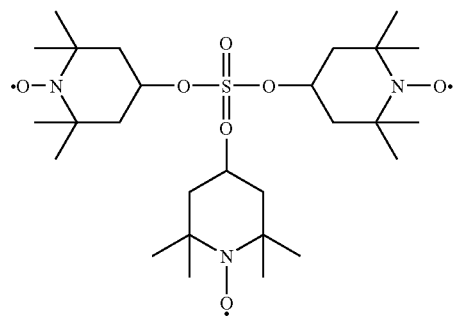
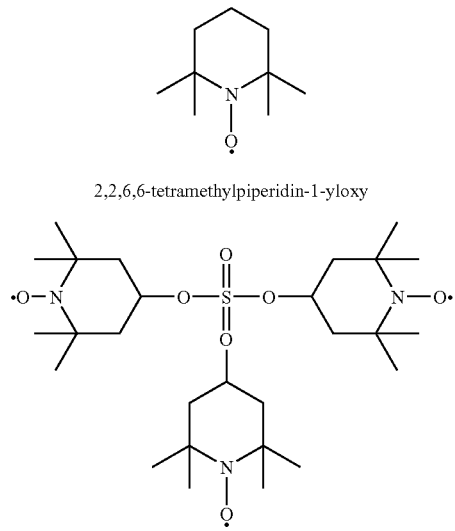
X; Br or Cl
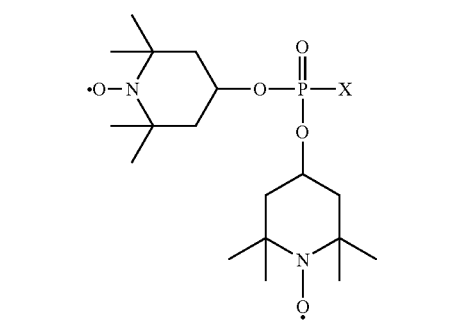
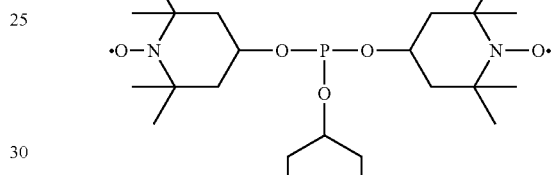
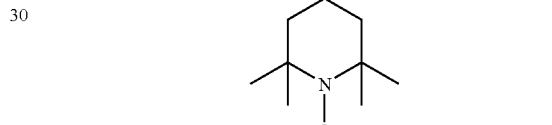
X; Br or Cl
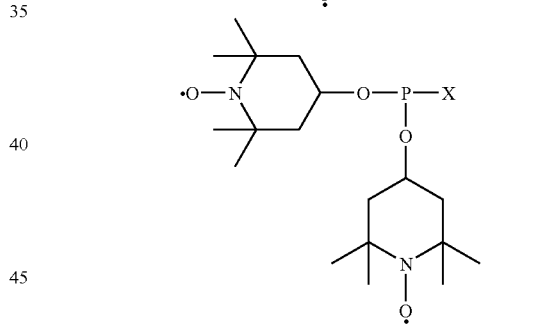
4-amino-2,2,6,6-tetramethyl-piperidinyloxy-TEMPO
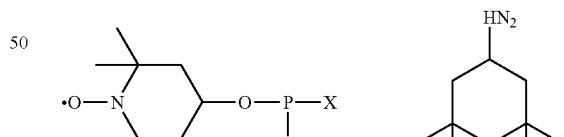
| 4-hydroxy-TEMPO | 4-isocyanate-TEMPO | 4-carboxy-TEMPO |

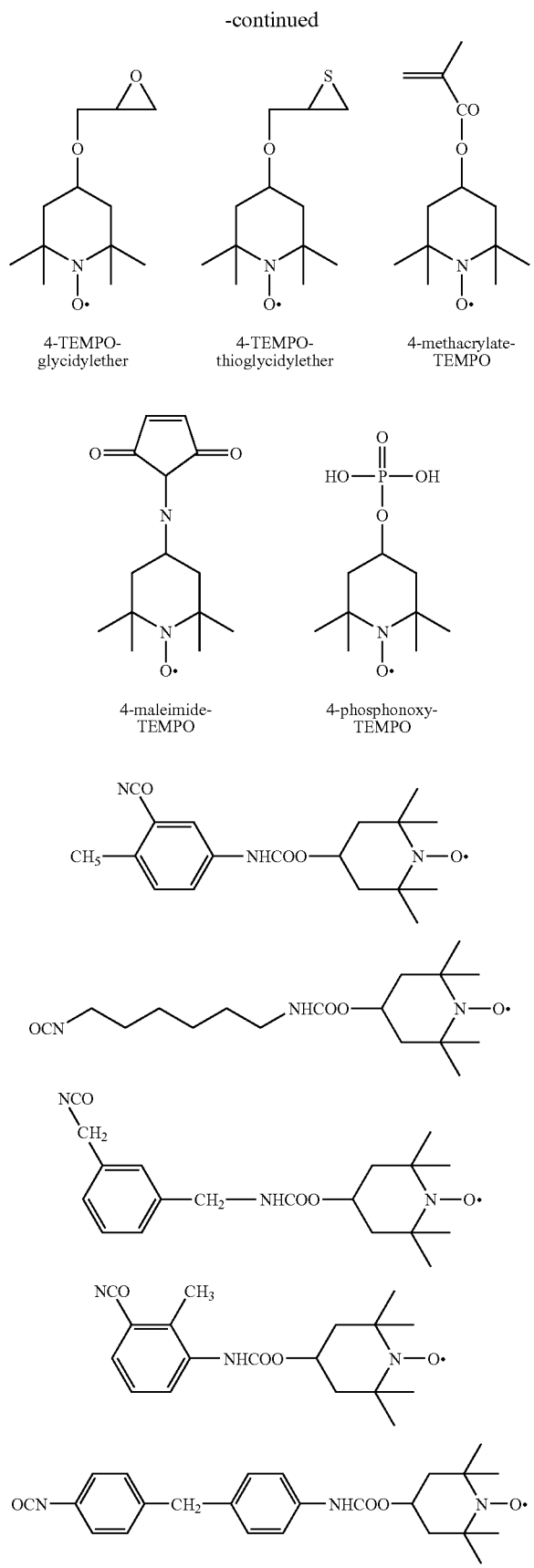
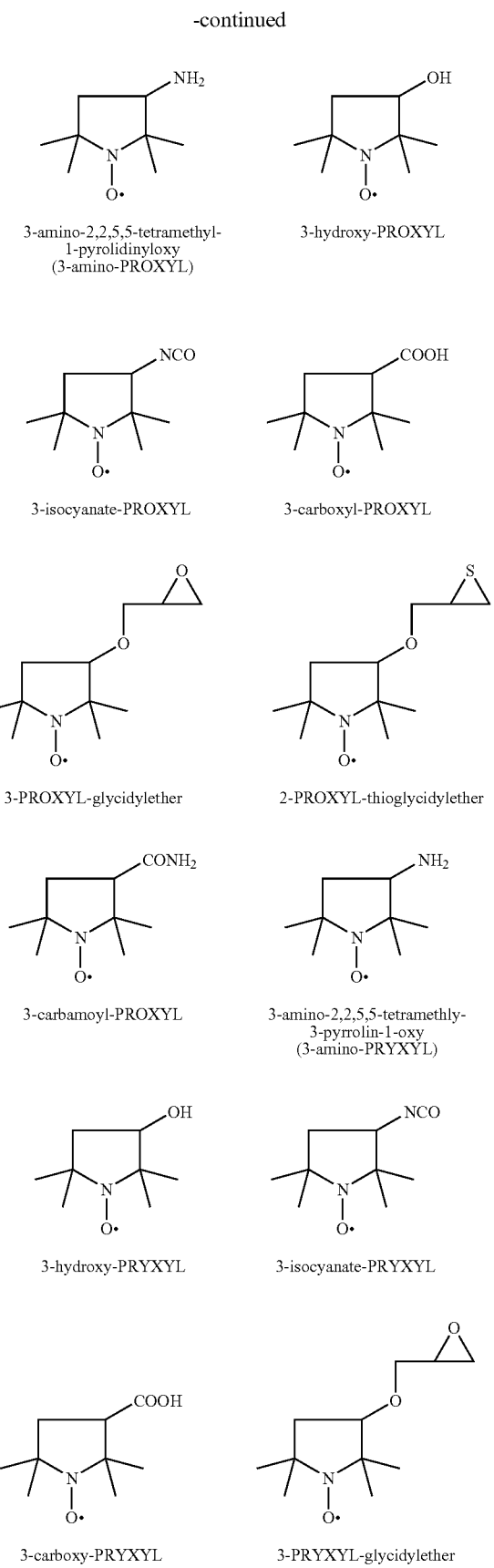

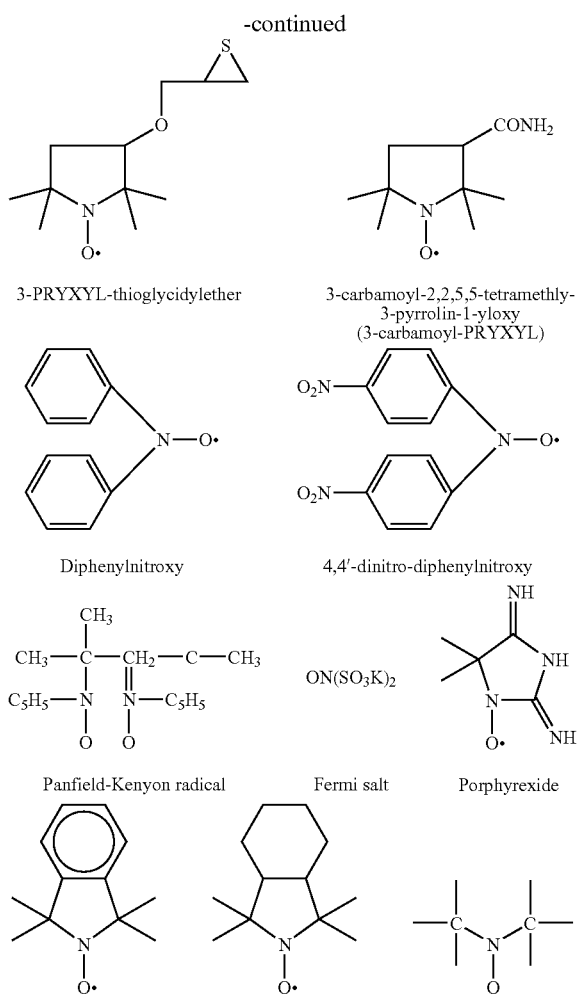

3-PRYXYL-thioglycidylether 3-carbamoyl-2,2,5,5-tetramethly-3-pyrrolin-1-yloxy (3-carbamoyl-PRYXYL)

Diphenylnitroxy 4,4'-dinitro-diphenylnitroxy

Panfield-Kenyon radical

Fermi salt

Porphyrexide

As the means for generating a carbon radical in the polymer, a radical initiator is added to the reaction system. The radical initiator usable in the present invention includes, for example, benzoyl peroxide (BPO), t-butyl peroxybenzoate (Z), dicumyl peroxide (DCP), t-butylcumyl peroxide (C), di-t-butyl peroxide (D), 2,5-dimethyl-2,5-di-t-butyl peroxyhexane (2,5B), 2,5-dimethyl-2,5-di-t-butylperoxy-3-hexyne (Hexyne-3), 2,4-dichloro-benzoyl peroxide (DC-BPO), di-t-butylperoxy-di-isopropylbenzene (P), 1,1-bis(t-butylperoxy)-3,3,5-trimethyl-cyclohexane (3M), n-butyl-4,4-bis(t-butylperoxy)valerate, 2,2-bis(t-butylperoxy)butane and other organic peroxides and azodicarbonamide (ADCA), azobis-isobutyronitrile (AIBN), 2,2'-azobis-(2-amidinopropane)dihydrochloride, dimethyl 2,2'-azobis (isobutyrate), azobis-cyanovaleric acid (ACVA), 1,1'-azobis-(cyclohexane-1-carbonitrile) (ACHN), 2,2'-azobis-(2,4-dimethylvaleronitrile) (ADVN), azobis-methylbutyronitrile (AMBN), 2,2'-azobis-(4-methoxy-2,4-dimethylvaleronitrile), and other radical generators. These may be added to the reaction system (or the mixed system or the catalyst system) of the polymer and such a compound having a nitroxide radical so as to cause the generation of the carbon radical in the polymer. The addition amount of the radical initiator is, based upon 100 parts by weight of the polymer, preferably 0.001 to 40 parts by weight, more preferably 0.005 to 30 parts by weight.

The ratio of the addition amounts of the compound having the nitroxide radical in the molecules thereof and the radical initiator, that is, the nitroxide radical/the radical initiator (molar ratio), should be within the range such that the molecular weight of the polymer is decreased, particularly less than 0.7 is preferable.

According to the present invention, as the organic group introduced into the polymer by modification of the polymer, for example, a $C_1$ to $C_{30}$ alkyl group, phenyl group, allyl group, amino group, isocyanate group, hydroxyl group, thiol group, vinyl group, epoxy group, thiurane group, carboxyl group, carbonyl-group-containing group (e.g., succinic anhydride, maleic anhydride, glutaric anhydride, phthalic anhydride, and other cyclic acid anhydrides), amide group, ester group, imide group, nitrile group, thiocyan group, $C_1$ to $C_{20}$ alkoxy group, silyl group, alkoxysilyl group, etc. may be mentioned.

In addition to the modified polymer, polymers such as a diene-based rubber, polyolefin-based rubber, thermoplastic TPE, polyolefin, thermoplastic resin, heat curing resin, reinforcing fillers, such as carbon black, silica, vulcanization or cross-linking agent, vulcanization or cross-linking accelerator, various types of oils, an antioxidant, plasticizer, and other various additives may be compounded. The compound may be mixed and vulcanized to obtain a composition by a general method and then, used for vulcanization or cross-linking. The compounding amounts of these additives may be made conventional amounts in so far as the object of the present invention is not contravened.

EXAMPLES

Examples will now be used to further explain the present invention, but the scope of the present invention is of course not limited to these Examples.

Examples 1 to 2 and Comparative Examples 1 to 3

The amounts (parts by weight) shown in Table I of the butyl rubber, radical initiator, and 2,2,6,6-tetramethyl piperidinyl-1-Oxyl derivative (OH-TEMPO) or glycidyl methacrylate (GMA) were charged into an internal Banbury mixer set to a temperature of 60° C. and mixed for 15 minutes. The mixture thus obtained was mixed in an internal Banbury mixer set to a temperature of 100° C. with nitrogen substitution for 5 minutes. While mixing, the temperature was raised to the temperature shown in Table I. The mixture was mixed at that temperature for 15 minutes.

TABLE I

| Ex. no. | Butyl rubber[1] (parts by weight) | Radical initiator (parts by weight) | | OH-TEMPO[3] (parts by weight) | GMA[4] (parts by weight) | Temp. (° C.) |
|---|---|---|---|---|---|---|
| Ex. 1 | 100 | DBP[2] | 8.9 | 3.4 | — | 185 |
| Ex. 2 | 100 | DBP | 8.7 | 10.2 | — | 165 |
| Comp. Ex. 1 | 100 | DBP | 2.7 | — | — | 175 |
| Comp. Ex. 2 | 100 | DBP | 6.5 | — | 7.0 | 185 |

TABLE I-continued

| Ex. no. | Butyl rubber[1] (parts by weight) | Radical initiator (parts by weight) | OH-TEMPO[3] (parts by weight) | GMA[4] (parts by weight) | Temp. (° C.) |
|---|---|---|---|---|---|
| Comp. Ex. 3 | 100 | DBP | 6.5 | 10 | — | 185 |

[1] BUTTYL 301 (made by Bayer)
[2] Di-t-butyl peroxide, Perbutyl D (made by NOF Corporation)
[3] 4-hydroxy-2,2,6,6-tetramethylpiperidinyl-1-oxyl, LA7RD (made by Asahi Denka Kogyo)
[4] Glycidyl methacrylate (made by Kanto Chemical)

Part of the polymer obtained was dissolved in toluene, and a reprecipitation operation was used to isolate and purify the modified polymer. The purified product was measured for weight average molecular weight by gel permeation chromatography (GPC) (standard: polystyrene, elute: tetrahydrofuran, measurement temperature: 40° C.). Further, $^1$H-NMR analysis and elemental analysis were performed to calculate the introduction rate of functional groups. The Mooney viscosity $ML_{1+4}$ (100° C.) was measured according to JIS K6300). The results are shown in Table II.

TABLE II

| Ex. no. | TEMPO/radical initiator (molar ratio) | Weight average molecular weight | Introduction rate (mol %) | Mooney viscosity ($ML_{1+4}$ (100° C.)) |
|---|---|---|---|---|
| Example 1 | 0.4 | 250,000 | 0.21 | 23 |
| Example 2 | 1.0 | 414,000 | 0.81 | 51 |
| Comp. Ex. 1 | 0 | 194,000 | — | 20 |
| Comp. Ex. 2 | 1.1 | 90,000 | Not quantifiable | 12 |
| Comp. Ex. 3 | 1.3 | 553,000 | 0.44 | 60 |
| Unmodified butyl rubber | 0 | 494,000 | — | 55 |

*GMA/radical initiator

INDUSTRIAL APPLICABILITY

As explained above, according to the present invention, as shown in Example 1, it is possible to modify low polarity butyl rubber and other polymers, while decreasing the molecular weight thereof by introducing TEMPO or another compound having nitroxide radicals in the molecule into the polymer. The modified polymer thus obtained is improved in compatibility with polar resins etc., superior in processability as well, and improved in bonding with glass etc., and therefore, is useful for sealing materials, binders, hot melts, tackifiers, compatibility agents and various other applications.

The invention claimed is:

1. A method for modifying a polymer comprising:
modifying the polymer capable of decomposing by carbon radicals present in said polymer by a reaction with a radical initiator and a compound having a nitroxide radical in said compound to thereby decrease a molecular weight of the polymer and also introduce an organic group derived the from nitroxide radical of said compound into the polymer, wherein a molar ratio of the nitroxide radicals and the radical initiator (i.e., the nitroxide radical/the radical initiator) is less than 0.7.

2. A method for modifying a polymer as claimed in claim 1, wherein said polymer is a polymer containing an isomonoolefin unit as the constituent units thereof.

3. A method for modifying a polymer as claimed in claim 2, wherein said polymer containing the isomonoolefin units, as the constituent units, is butyl rubber.

4. A method for modifying a polymer as claimed in claim 1, wherein said organic group is a $C_1$ to $C_{30}$ alkyl group, phenyl group, allyl group, amino group, isocyanate group, hydroxyl group, thiol group, vinyl group, epoxy group, thiurane group, carboxyl group, carbonyl-group-containing group, amide group, ester group, imide group, nitrile group, thiocyan group, $C_1$ to $C_{20}$ alkoxy group, silyl group or alkoxysilyl group.

5. A method for modifying a polymer as claimed in claim 4, wherein said carbonyl-group-containing group is selected from a group consisting of succinic anhydride, maleic anhydride, glutaric anhydride, phthalic anhydride, and other cyclic acid anhydrides.

* * * * *